United States Patent [19]

Kobayashi et al.

[11] 4,396,815
[45] Aug. 2, 1983

[54] EMERGENCY SWITCH

[75] Inventors: Tetuo Kobayashi; Naoki Matsunami, both of Ikeda, Japan

[73] Assignee: Nippon Cable System Inc., Hyogo, Japan

[21] Appl. No.: 281,408

[22] Filed: Jul. 8, 1981

[30] Foreign Application Priority Data

Oct. 6, 1980 [JP] Japan ..................... 55-142558[U]

[51] Int. Cl.³ .......................................... H01H 17/26
[52] U.S. Cl. ..................................... 200/161; 200/79; 200/61.85
[58] Field of Search .......... 200/161, 329, 334, 153 M, 200/61.85, 61.87, 61.89, 79, 153 F, 153 S

[56] References Cited

U.S. PATENT DOCUMENTS

| 450,626 | 4/1891 | Kerstein | 200/79 |
| 505,032 | 9/1893 | Curry | 200/79 |
| 3,703,620 | 11/1972 | Watanabe | 200/161 |
| 3,798,402 | 3/1974 | Raab | 200/161 |
| 3,818,169 | 6/1974 | Kobernus | 200/159 A |
| 3,870,846 | 3/1975 | Filip | 200/161 |

Primary Examiner—John W. Shepperd
Assistant Examiner—Renee Kidorf
Attorney, Agent, or Firm—Armstrong, Nikaido, Marmelstein & Kubovcik

[57] ABSTRACT

An emergency switch for preventing an accident in a mechanism employing a control cable, comprising a casing having a pair of contacts at opposite inner side surfaces thereof, and an insulator member having a movable contact, the insulator member being slidably and axially moved within the casing in connection with tensile force of inner cables, and when the inner cables become unoperable by trouble, the movable contact being touched to the contacts provided on the inner side surfaces of the casing to detect a trouble or to stop the movement of the mechanism.

3 Claims, 5 Drawing Figures

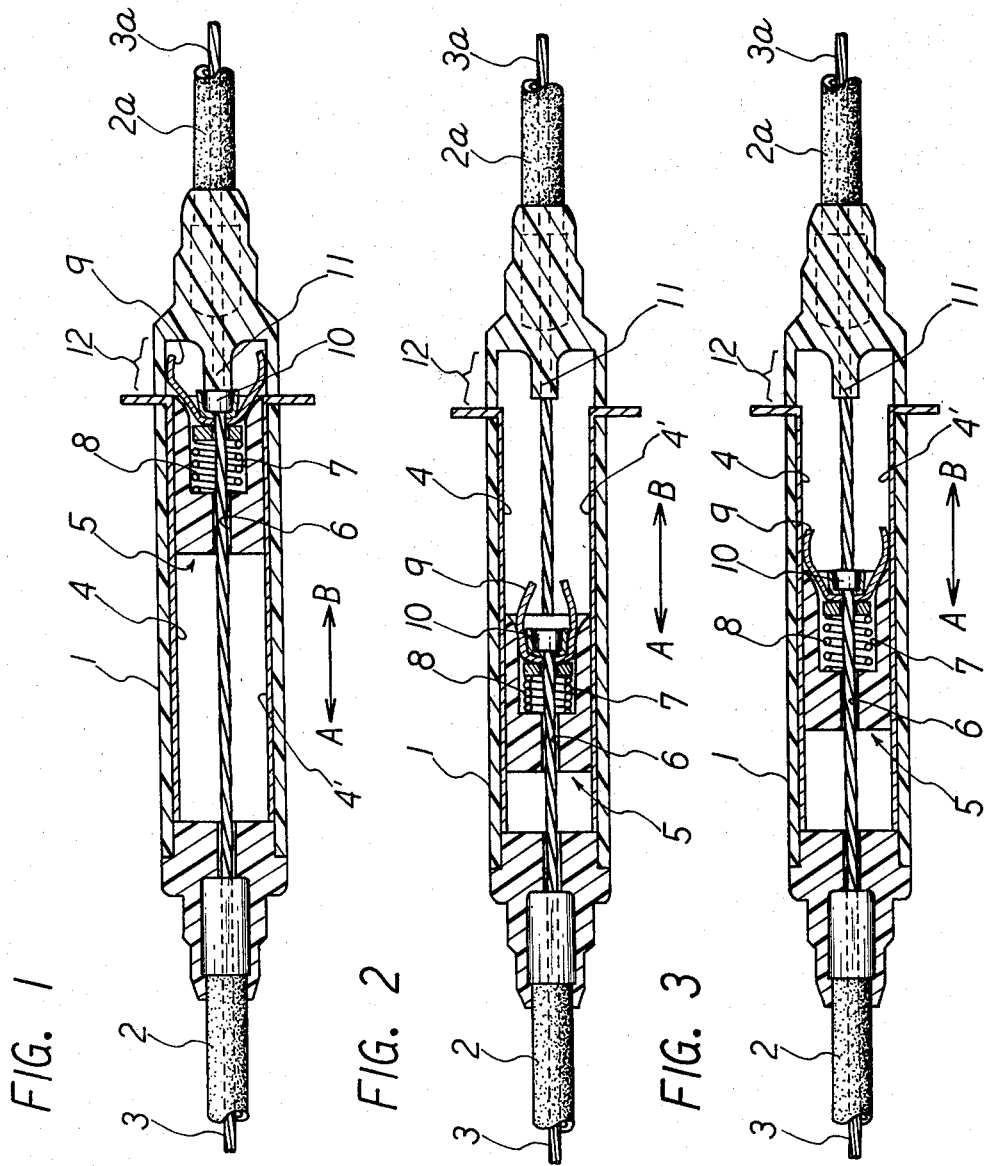

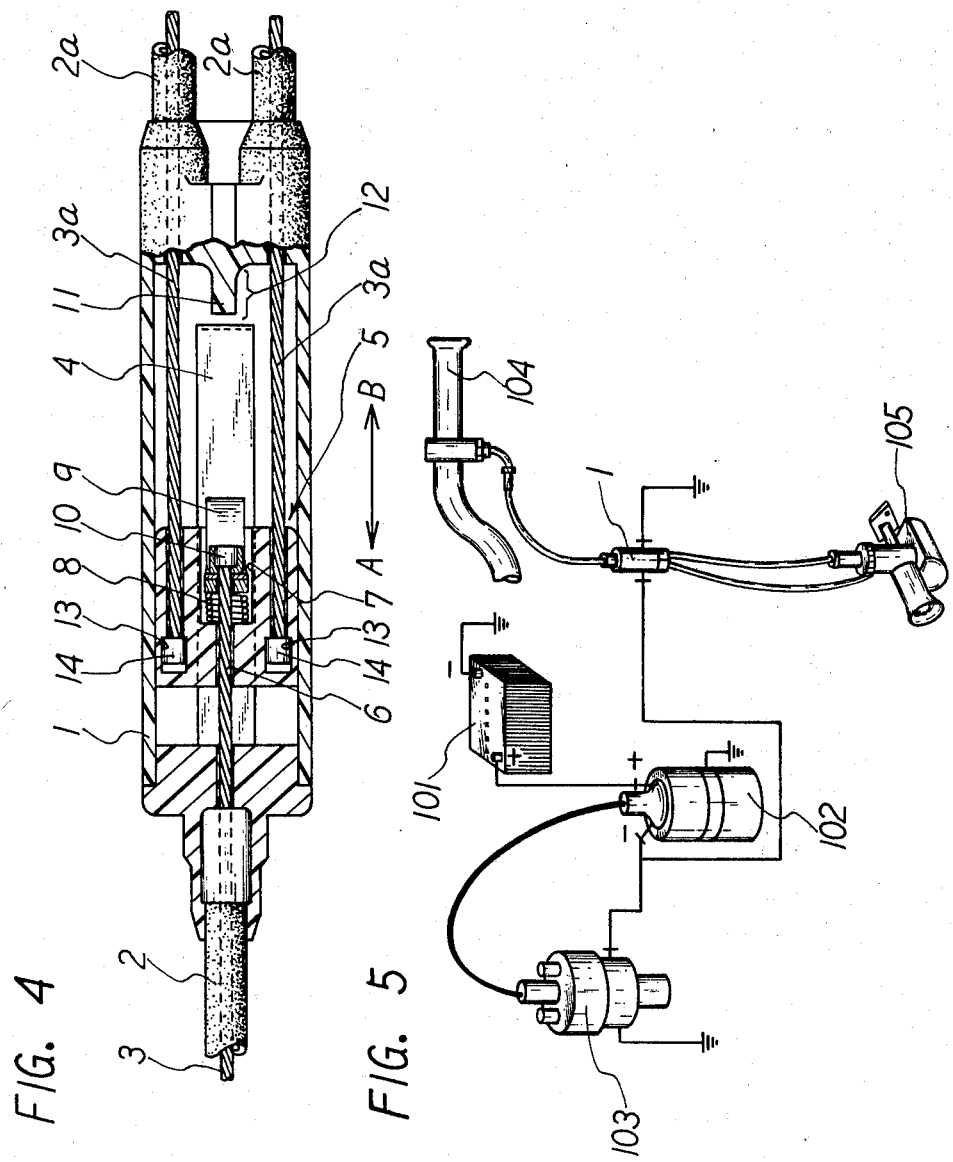

EMERGENCY SWITCH

BACKGROUND OF THE INVENTION

The present invention relates to an emergency switch, and more particularly to the emergency switch for preventing accidents resulting from any trouble made in either a control cable (hereinafter referred to as "cable") which is used for remote control in industrial apparatus or a mechanism connected to such a cable.

In a running motorcycle, when a carburetor makes any trouble, a throttle valve is maintained in the opening state, and does not return when a grip is returned. Therefore, the motorcycle runs without control to thereby cause an accident. In another case of a snowmobile, when the carburetor is frozen while the snowmobile is running, the throttle valve cannot be returned. As a result, an accident happens. Furthermore, any accident is caused by snap of the cable in rare cases. However, until now, any device which can detect such troubles made in the cable or apparatus employing cables is not known. For this reason, the accidents as mentioned above cannot be prevented before it happens.

OBJECT OF THE INVENTION

The main object of the present invention is to provide a emergency switch for preventing accidents resulting from any trouble made in either cable which is used for remote control in industrial apparatus or a machanism connected to such a cable.

Other objects and advantages of the invention will become apparent from the following description with reference to the accompanying drawings.

BRIEF DESCRIPTION OF THE DRAWINGS

FIG. 1 is a side view partially broken away for showing a state before operation of an embodiment of an emergency switch of the invention;

FIG. 2 is a side view partially broken away for showing a state during operation of the same switch as FIG. 1;

FIG. 3 is a side view partially broken away for showing a state after operation of the same switch as FIG. 1;

FIG. 4 is a front view partially broken away for showing a state during operation of the same switch as FIG. 1; and FIG. 5 is a schematically perspective view for showing an embodiment of an emergency switch of the invention in pratical use.

DETAILED DESCRIPTION OF THE INVENTION

FIGS. 1 to 4 show an embodiment of the invention employed in the throttle cable for a motorcycle.

Referring to FIGS. 1 to 4, the conduits 2 and 2a of the cables are secured to both ends of a casing 1 respectively, and a pair of contacts 4 and 4' axially extending with a suitable length are provided on the opposite inner side surfaces of the casing 1 respectively. An insulator member 5 is inserted into the casing 1 so as to axially and slidably move in the casing 1. As shown in FIG. 4, two cable-end fittings 14 fixed to each inner cables 3a are secured in the engaging holes 13 formed in the insulator member 5. An inner cable-inserting hole 6 for inserting the other inner cable 3 is axially perforated at a center area of the insulator member 5. A movable contact-containing hole 7 (hereinafter referred to as "containing hole") continued to the inner cable-inserting hole 6 is also provided. Both a coil spring 8 and a movable contact 9 of an electric conductible metal spring piece are contained in the containing hole 7, and they are fixed by an end fitting 10 for the other inner cable 3, so that the coil spring 8 and the movable contact 9 do not fall out from the casing 1. Indicated at 11 is a stopper which stops the sliding of the insulator member 5 in the direction B at a certain position to prevent the damage of the movable contact 9. Indicated at 12 is a non-contact area where both contacts 4 and 4' and 9 do not touch together in an idling state.

With reference to FIG. 5, a plus terminal of a battery 101 in a motorcycle is connected to a low-tension plus terminal of an induction coil 102, while a minus terminal of the battery is grounded. A minus terminal of the induction coil 102 is connected to a spark plug cable terminal of distributor 103. In such an electric circuit, one of a pair contacts 4 and 4' in the emergency switch is connected to the minus terminal of the induction coil 102, and the other is grounded.

The operations and the advantages of the embodiment of this invention will be explained in detail.

With reference to FIG. 1, at the idling state, when the throttle valve is closed entirely, the movable contact 9 touches the opposite inner side surfaces of the casing 1, but the movable contact 9 stays in the non-contact area 12, so that the electric circuit is opened and the engine is not stopped. That is to say, the insulator member 5 is drawn through the inner cables 3a engaged to the insulator member 5 in the direction B by a return-spring (not shown) positioned in the side of a carburetter 105, so that the movable contact 9 is maintained in the non-contact area 12.

When a grip 104 is operated to open the throttle valve (not shown) in the carburetor 105, the inner cable 3 is pulled in the direction A against the return spring. Therefore, the end fitting 10 fixed to the end of the inner cable pulls the movable contact 9 within the containing hole 7, simultaneously presses the coil spring 8. Thus, as shown in FIG. 2, the both top ends of the movable contact 9 are deflected inward radially, so that it does not touch the contacts 4. For this reason, the grip can be controlled without stopping the engine under normal conditions.

When a trouble in a carburetor keeps the opening of the throttle valve without returning while the motorcycle is running, the insulator member 5 does not move in the direction B even if the driver attempts to move the inner cable 3 in the direction B by the operating grip 104. However, in order that the coil spring 8 urges the insulator member 5 in the direction B, the movable contact 9 is pushed out from the containing hole 7 in the direction B, and simultaneously is opened outward radially to touch the contacts 4 of the casing 1, as shown in FIG. 3.

Thus, in the electric circuit, for example, as shown in FIG. 5, the electric circuit is closed to stop the engine. Accordingly, the accident can be prevented before it happens.

With reference to the above mentioned explanations and the accompanied drawings, though the embodiment that the emergency switch provided to the throttle cable to prevent the accident due to the trouble of the carburetor is explained, it is apparent that the emergency switch of the invention can be preferablly employed, for example, for stopping engines, lighting warning lamps or sounding warning buzzers to prevent the accidents due to the trouble of the clutch mechanism of vehicles, or the like, or due to the trouble of other mechanisms employing the cable in many kinds of industrial apparatus.

What is claimed is:

1. An emergency switch for use with a control cable mechanism having at least two control cables, said switch comprising:
    (a) a casing having at least one opening at each end thereof, said control cables having ends thereof extending through said openings into said casing;
    (b) a pair of electrical contacts mounted on the inside surface of said casing and extending in the axial direction of said casing along a portion thereof;
    (c) an insulator means, slidable positioned in said casing, said insulator means having at least one cable inserting hole for receiving the end of at least one of said cables, at least one engaging hole for receiving the end of at least one of the other cables, and a movable contact containing hole;
    (d) movable contact means consisting of a single metal spring piece, said spring piece having contact arms biased radially outward in a normal state, said contact means being coupled to the end of said other cable and slidably positioned in said containing hole, wherein said contact arms are pulled radially inward into said containing hole when said contact means is pulled, by the movement of said other cable, such that at least a portion of said contact arms are maintained in said containing hole;
    (e) coil spring means positioned in said containing hole for biasing said contact means against the pulling force of said other cable such that when there is no tension on said other cable, said coil spring means slides said contact means in said containing hole such that said contact arms extend radially outward therefrom and contact said electrical contacts; and
    (f) stopper means positioned at one end of said casing, said stopper means stopping the movement of said insulator means in said casing, wherein when said insulator means is stopped by said stopper means and the biasing force of said coil spring means is greater than the tension of said other cable, said contact means slides in said containing hole such that said contact arms extend radially outward and contact said insulator means on a portion other than that portion along which said electrical contacts extend.

2. An emergency switch as set forth in claim 1, further including end fitting means fixed to the ends of said cables, said end fitting means on the end of said at least one other cable holding said contact means against said coil spring means.

3. An emergency switch as set forth in claim 2, wherein said end fitting means contacts said stopper means for stopping the movement of said insulator means.

* * * * *